(12) United States Patent
Budde et al.

(10) Patent No.: US 7,159,880 B2
(45) Date of Patent: Jan. 9, 2007

(54) FORCE CONNECTION STRUT

(75) Inventors: Frank Budde, Damme (DE); Jochen Kruse, Osnabrück (DE); Stefan Schönhoff, Osnabrück (DE)

(73) Assignee: ZF Lemförder Metallwaren AG (DE)

( * ) Notice: Subject to any disclaimer, the term of this patent is extended or adjusted under 35 U.S.C. 154(b) by 258 days.

(21) Appl. No.: 10/466,967

(22) PCT Filed: Nov. 4, 2002

(86) PCT No.: PCT/DE02/04082

§ 371 (c)(1),
(2), (4) Date: Jul. 21, 2003

(87) PCT Pub. No.: WO03/039892

PCT Pub. Date: May 15, 2003

(65) Prior Publication Data

US 2004/0070129 A1 Apr. 15, 2004

(30) Foreign Application Priority Data

Nov. 5, 2001 (DE) ................................. 101 53 799

(51) Int. Cl.
*B60G 3/02* (2006.01)
*B60G 7/00* (2006.01)

(52) U.S. Cl. ................... 280/124.128; 280/124.134; 280/124.153

(58) Field of Classification Search ......... 280/124.126, 280/124.128, 124.134, 124.153, 93.51; F16C 7/00, F16C 7/02; B60G 7/00
See application file for complete search history.

(56) References Cited

U.S. PATENT DOCUMENTS

| | | | | |
|---|---|---|---|---|
| 3,362,252 A | * | 1/1968 | Ditlinger | 74/579 R |
| 3,825,090 A | * | 7/1974 | Runkle et al. | 180/292 |
| 4,226,440 A | * | 10/1980 | Chappell et al. | 280/43 |
| 4,509,774 A | * | 4/1985 | Booher | 280/124.134 |
| 4,659,069 A | * | 4/1987 | Odobasic | 267/280 |
| 5,224,783 A | | 7/1993 | Schmidt et al. | |
| 5,707,073 A | * | 1/1998 | Stuker et al. | 280/89.11 |
| 5,924,316 A | | 7/1999 | Streubel et al. | |
| 6,030,570 A | * | 2/2000 | McLaughlin | 264/279 |
| 6,152,468 A | * | 11/2000 | Glaser et al. | 280/124.134 |
| 6,189,904 B1 | * | 2/2001 | Gentry et al. | 280/124.175 |
| 6,250,657 B1 | | 6/2001 | Valin et al. | |
| 6,272,809 B1 | * | 8/2001 | Wycech | 52/731.6 |
| 6,324,940 B1 | * | 12/2001 | Pazdirek et al. | 74/579 R |
| 6,361,032 B1 | * | 3/2002 | Lawson | 267/158 |
| 6,471,226 B1 | | 10/2002 | Klaas | |
| 6,530,587 B1 | * | 3/2003 | Lawson et al. | 280/124.17 |

(Continued)

FOREIGN PATENT DOCUMENTS

DE 30 04 194 8/1981

(Continued)

Primary Examiner—Paul N. Dickson
Assistant Examiner—Laura B. Rosenberg
(74) Attorney, Agent, or Firm—McGlew & Tuttle, P.C.

(57) ABSTRACT

A connection strut of a chassis of a passenger car or utility vehicle for the connection between the chassis and the wheel carrier, preferably an axle strut or a chassis control arm, with an elongated basic body and at least two mount supports arranged at the end for introducing and leading out forces. The basic body has a composite between a flat metal insert and a plastic structure forming the rest of the contour. The plastic structure is formed by encasement of the metal insert. The rest of the contour is defined here as the difference between the final contour of the force connection strut and the portion that is formed by the metal insert.

30 Claims, 8 Drawing Sheets

U.S. PATENT DOCUMENTS

| | | | |
|---|---|---|---|
| 6,666,467 B1 * | 12/2003 | Bernhardt | 280/93.51 |
| 6,811,169 B1 * | 11/2004 | Schroeder et al. | 280/124.171 |
| 2001/0050469 A1 | 12/2001 | Bernhardt | |

FOREIGN PATENT DOCUMENTS

| | | |
|---|---|---|
| DE | 34 12 578 | 8/1985 |
| DE | 33 32 771 | 9/1987 |
| DE | 38 39 855 | 5/1990 |
| DE | 41 20 772 | 1/1993 |
| DE | 296 20 812 | 3/1997 |
| DE | 297 04 863 | 7/1997 |
| DE | 196 04 357 | 8/1997 |
| DE | 198 02 685 | 7/1999 |
| DE | 198 14 792 | 10/1999 |
| DE | 199 31 079 | 2/2000 |
| DE | 200 10 341 | 11/2000 |
| EP | 0 849 491 | 6/1998 |
| EP | 0 851 131 | 7/1998 |
| FR | 2 765 503 | 1/1999 |
| JP | 58218407 A * | 12/1983 |
| JP | 11241745 A * | 9/1999 |

* cited by examiner

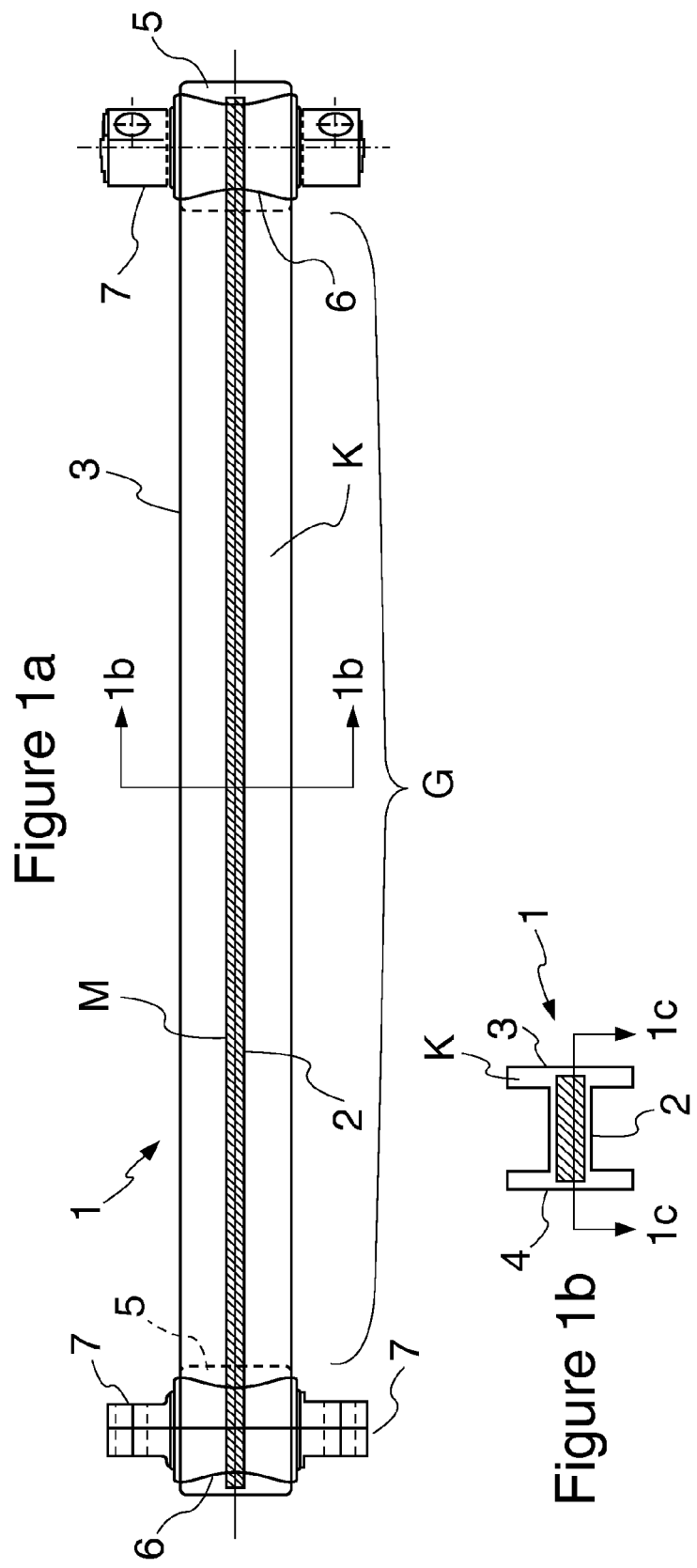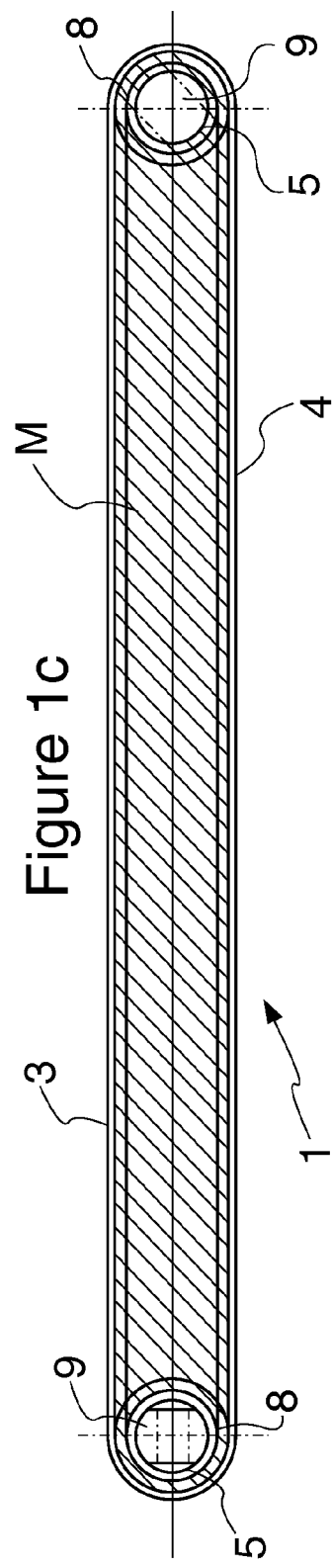

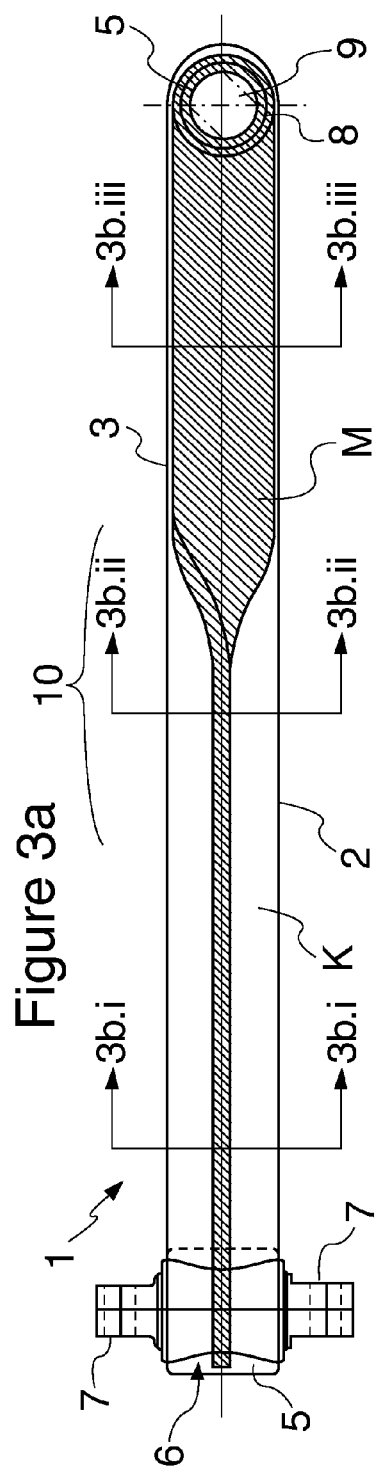
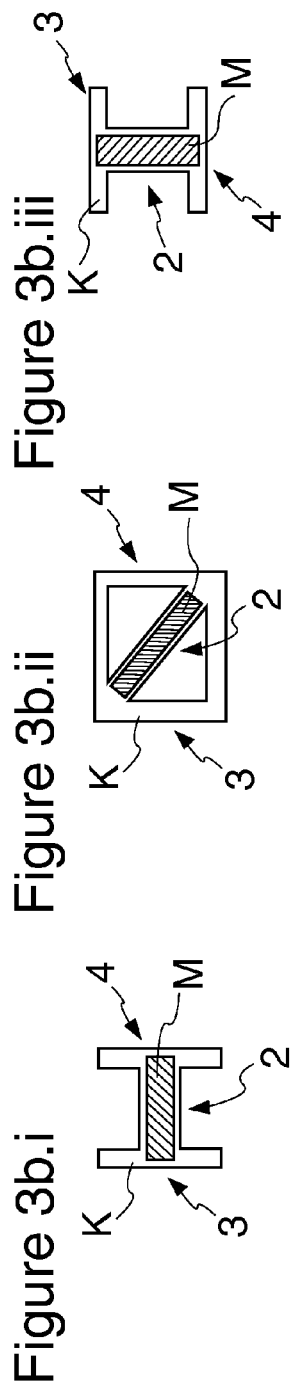
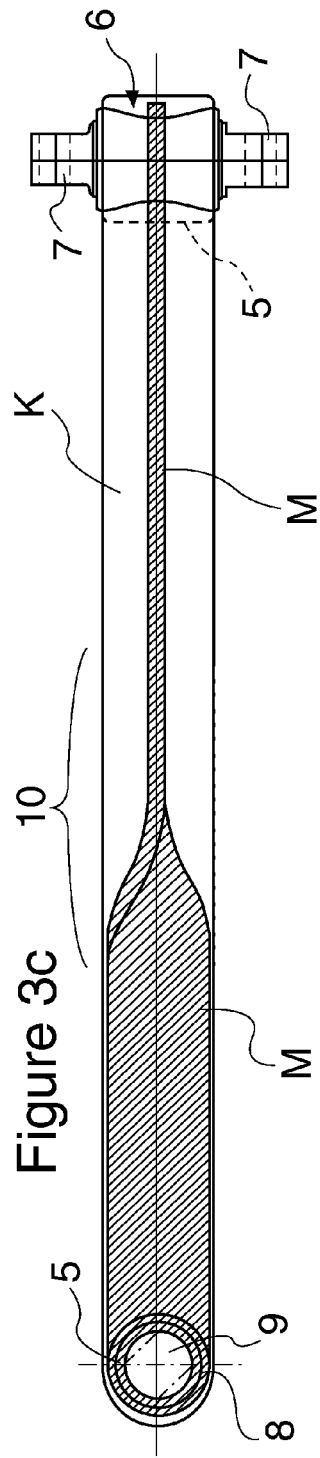

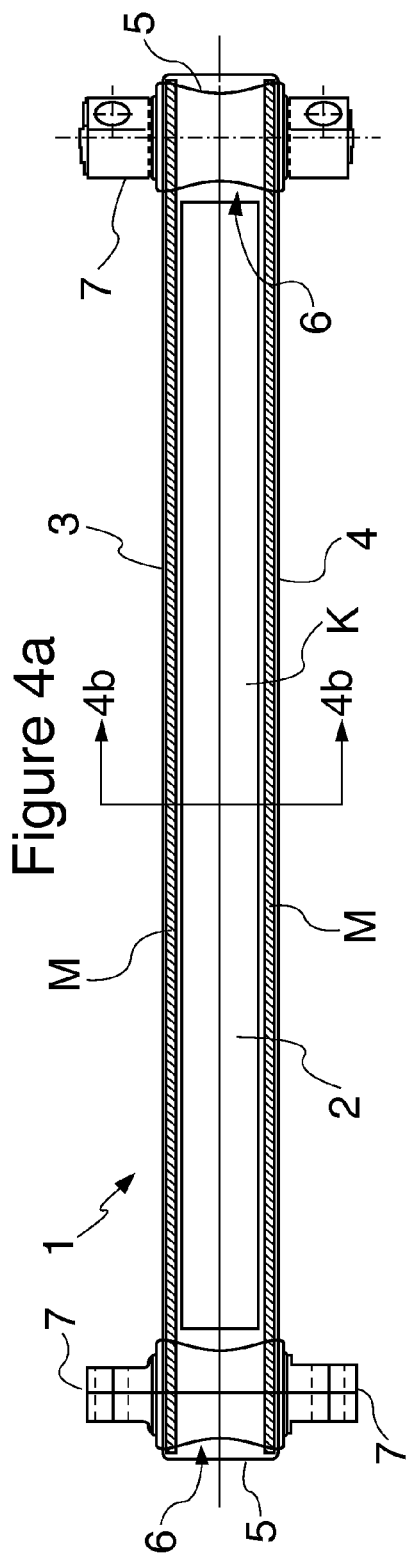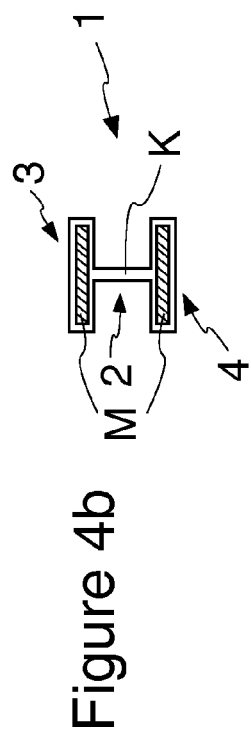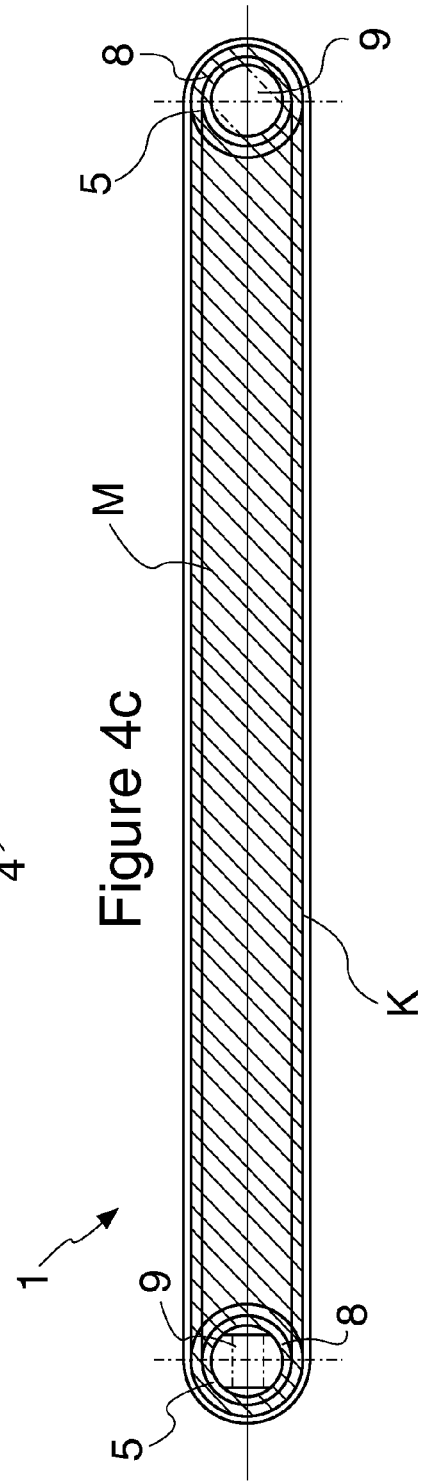

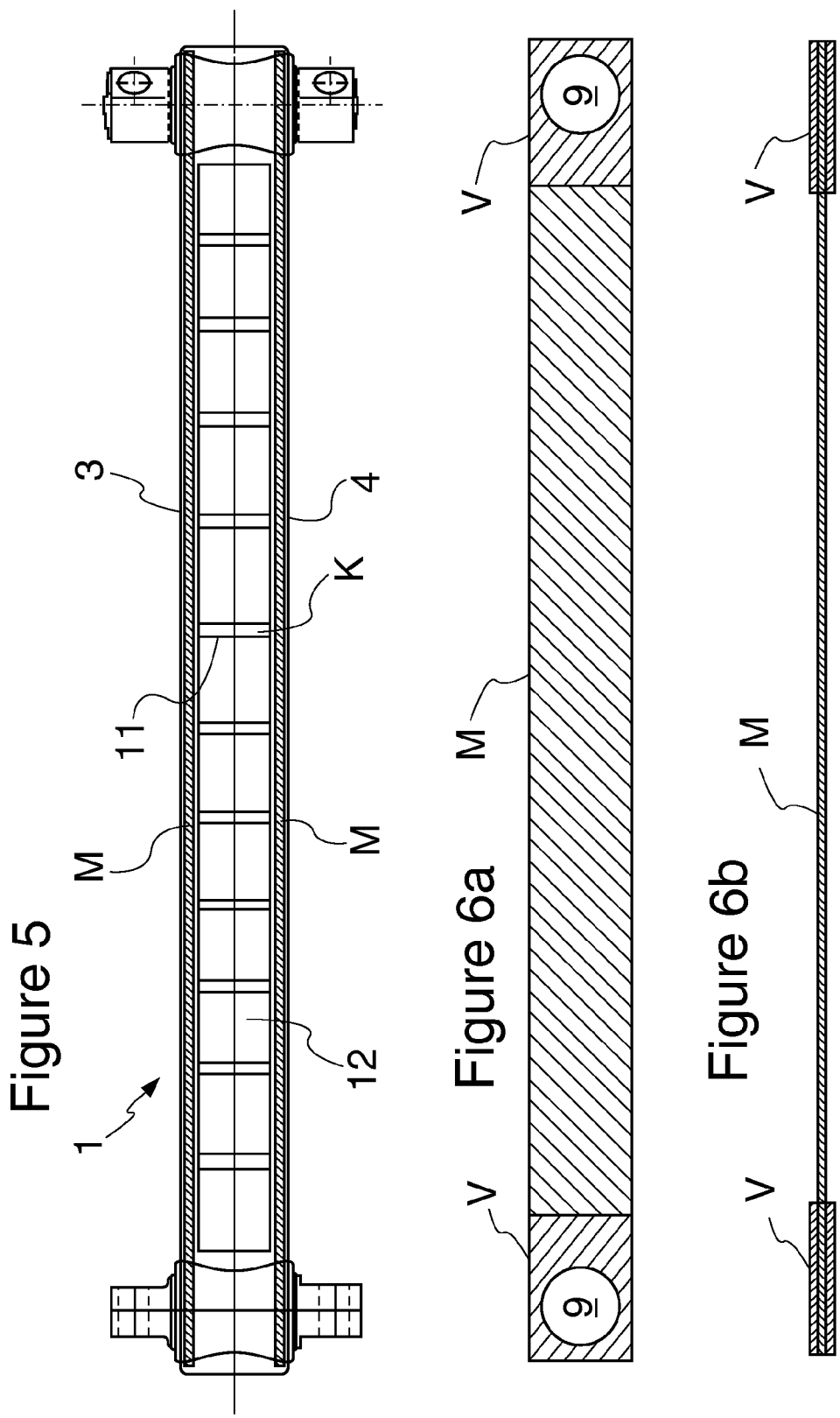

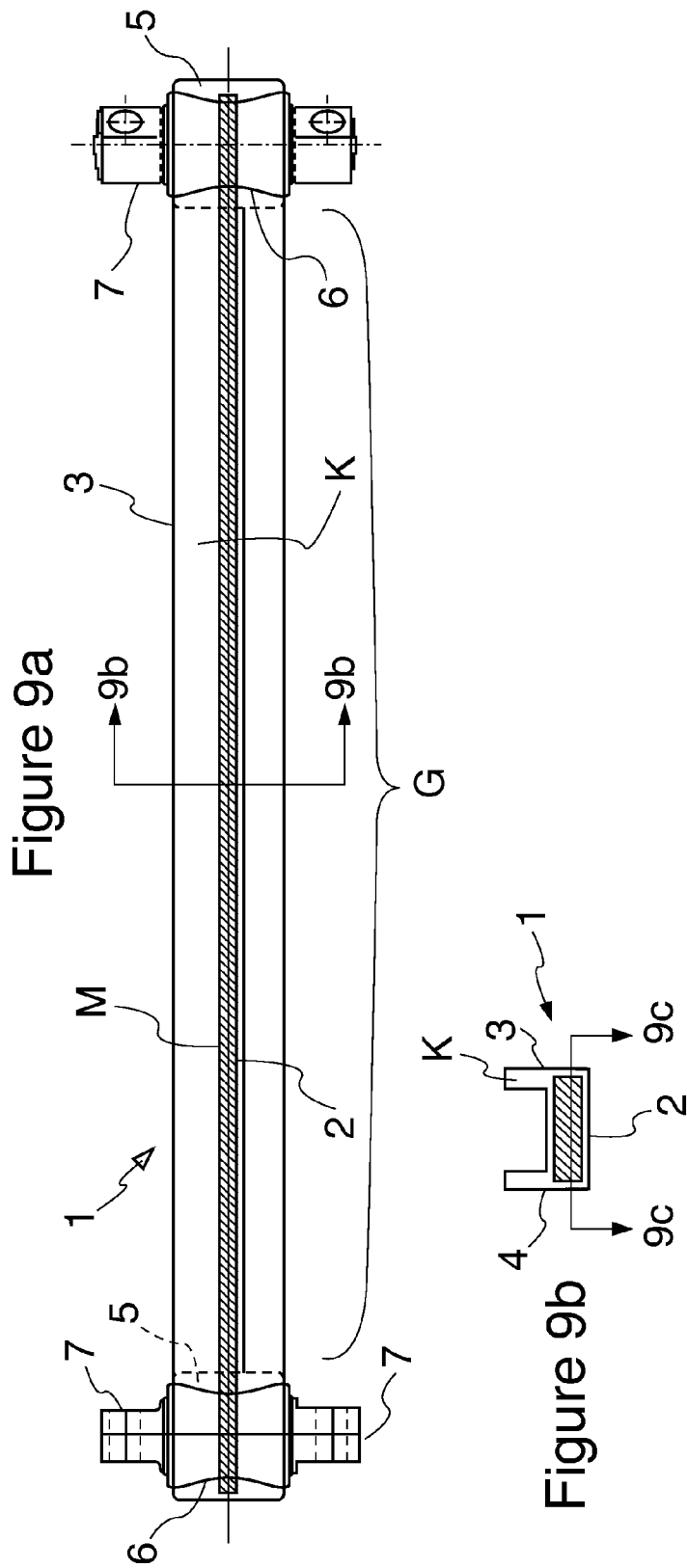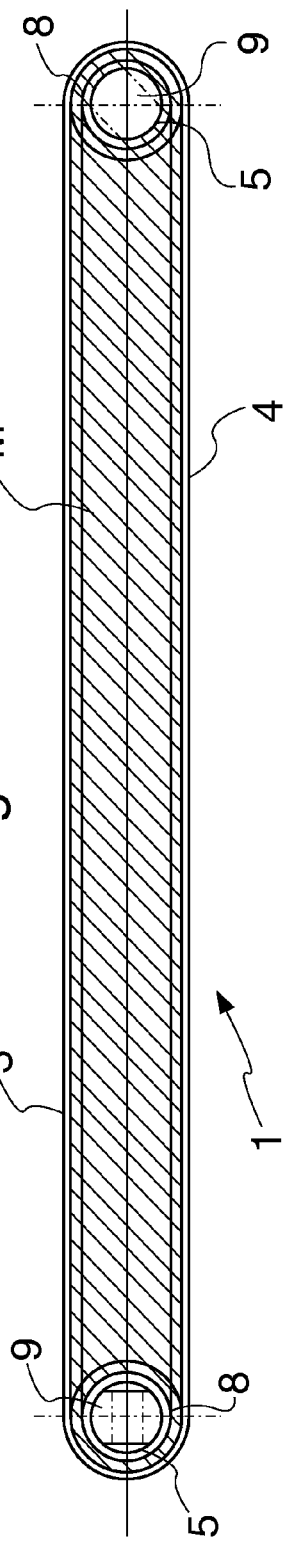

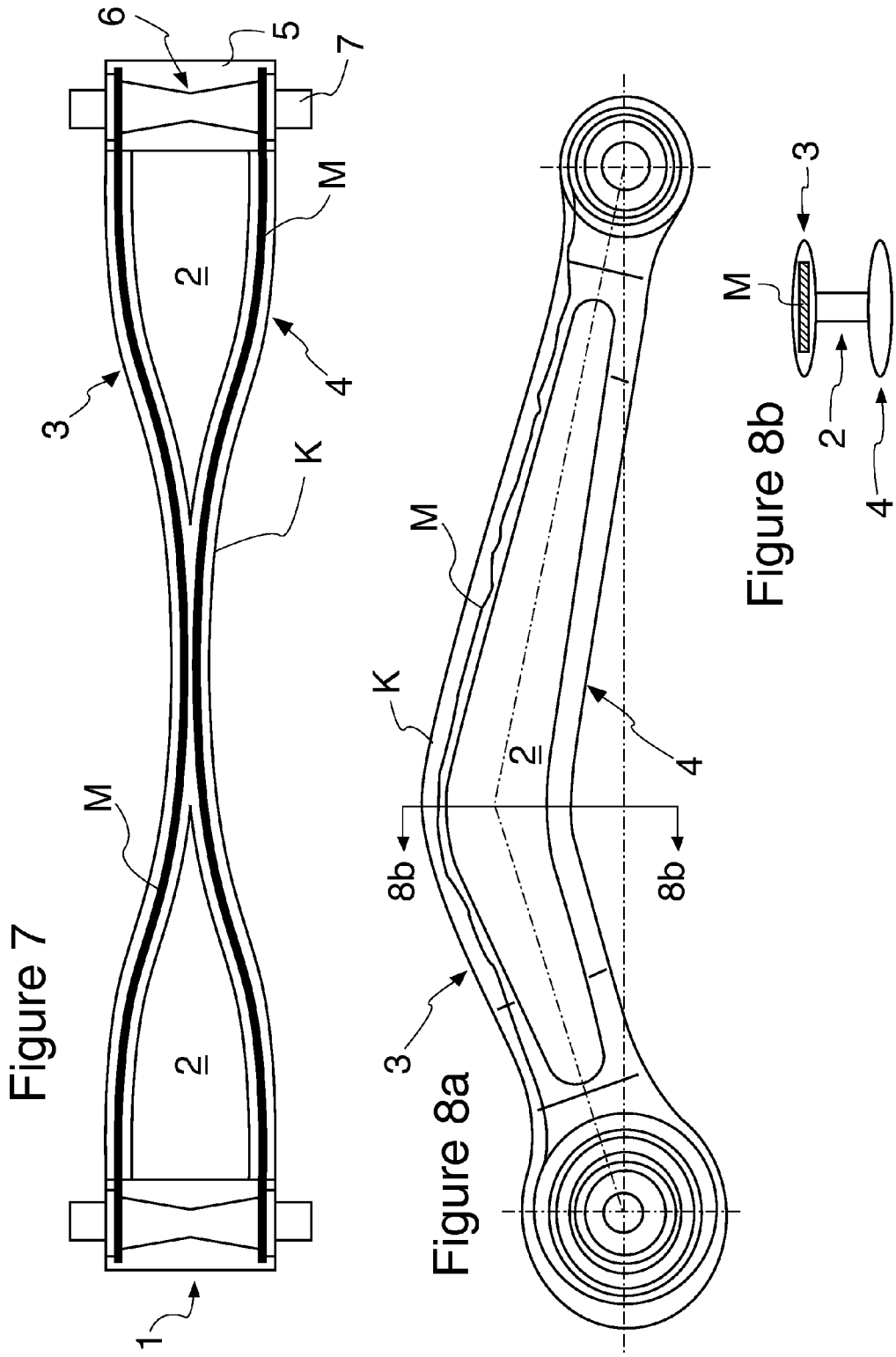

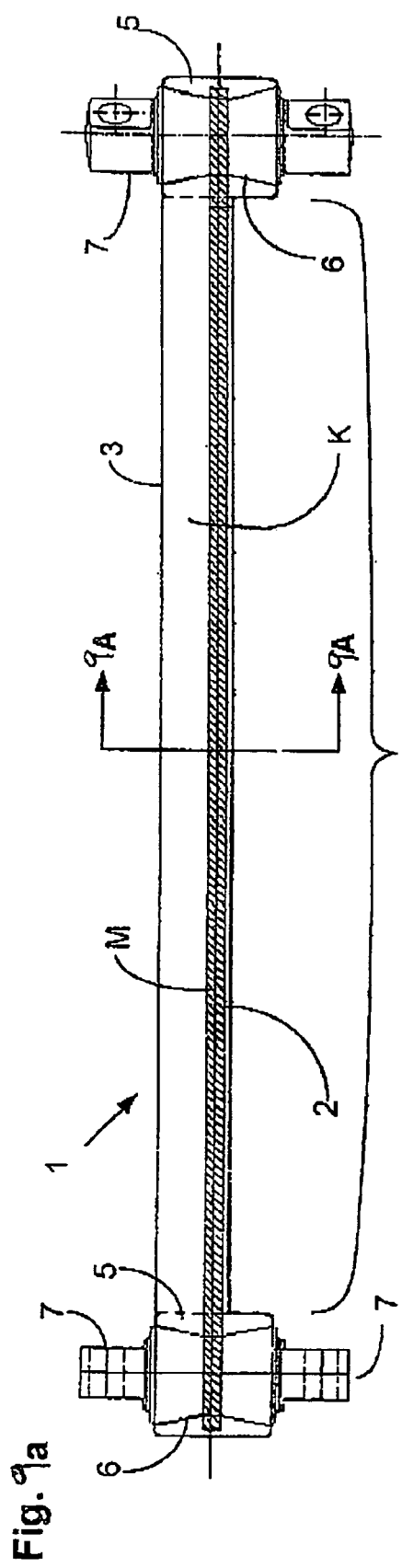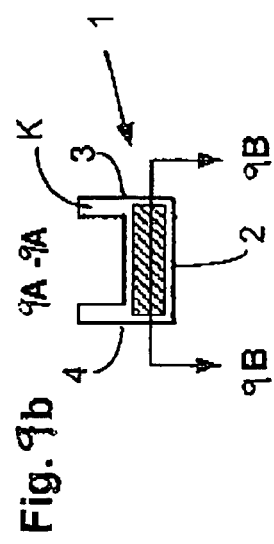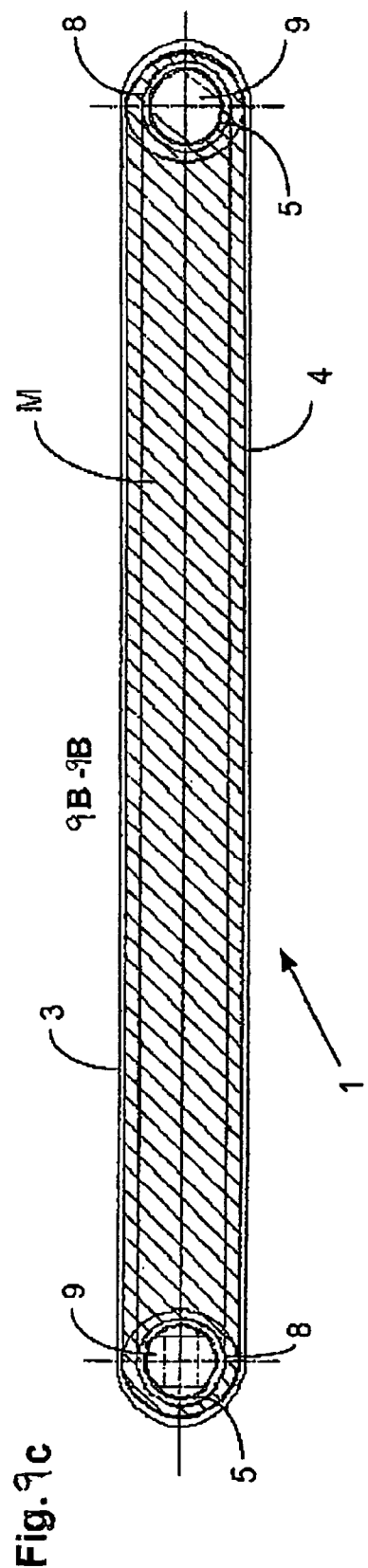

FORCE CONNECTION STRUT

FIELD OF THE INVENTION

The invention relates generally to a force connection strut of a chassis of a passenger car or utility vehicle and more particularly the present invention pertains to a force connection strut of a chassis of a passenger car or utility vehicle for connection between the chassis and the wheel carrier, preferably an axle strut or a chassis control arm, with an elongated basic body and at least two mount supports arranged at the end for introducing and leading out forces.

BACKGROUND OF THE INVENTION

Such chassis parts are generally known. Reference is made as an example to the documents DE 41 20 772 C2, DE 33 32 771 C2 and DE 199 31 079 A1.

The above-mentioned documents pertain to force-transmitting chassis parts, which comprise essentially an elongated basic body and mount supports arranged at the end with mounts. Even though the mount supports and mounts are made in these cases of composite materials, i.e., a combination of metals and plastic components, the elongated basic body consistently consists of metal.

It was found in the course of the development that the chassis parts, whose basic body is made mostly from forged steel or gray cast iron, do not meet the increased requirements concerning the characteristics of the materials, and the possibilities are also exhausted concerning weight reduction in the case of all-metal basic bodies.

An all-plastic basic body is sometimes also used instead of an all-metal basic body to optimize the weight, but such chassis parts made of plastic inherently have the problem that these plastics usually tend to undergo brittle fracture if they have the sufficient strength properties. This means that the function of these chassis parts is lost 100% after damage to such a chassis part, whereas a complete loss of function does not occur in the case of chassis parts made of metal, even though bending and deformation develop.

Even though composite materials based on sheet metal-plastic combinations in the manufacture of automobiles have been known from the literature, e.g., from the Offenlegungsschrift DE 38 39 855 A1, the applications proposed there are structural parts for motor vehicle doors, shock absorbers, supports, front and rear shells or door sills, in which the sheet metal parts which determine the outer shape are said to have increased strength or rigidity due to plastic ribbing. None of these lightweight components proposed is, however, suitable for absorbing massive compressive/tensile forces as they occur in chassis parts.

SUMMARY OF THE INVENTION

The object of the present invention is therefore to develop a force connection strut of a chassis for a passenger car or utility vehicle, which has, on the one hand, the advantages of plastic elements in terms of weight, but, on the other hand, does not suffer an immediate total loss of its functionality even in case of damage.

According to the invention the prior-art force connection strut of a chassis of a passenger car or utility vehicle for the connection between the chassis and the wheel carrier, preferably an axle strut or a chassis control arm, with an elongated basic body and at least two mount supports arranged at the end for introducing and leading out forces is improved such that the basic body has a composite between a flat metal insert and a plastic structure forming the rest of the contour. The plastic structure is formed by encasing the metal insert. The rest of the contour is defined here as the difference between the final contour of the force connection strut and the portion that is formed by the metal insert.

This combination in a force connection strut now makes it possible, on the one hand, to utilize the advantages of a plastic structure and to achieve a considerable weight reduction along with high strength, while, on the other hand, it is ensured by the metal insert that no immediate 100% loss of function will develop even in case of damage.

Another advantage is that the manufacture of relatively complex plastic structures can be carried out in a substantially simpler manner than that of all-metal structures. For example, a highly complex shape with a broad scope of function can be produced according to the invention with a very simply structured metal insert prepared according to the invention by means of encasement with a plastic.

It is advantageous according to the invention for the metal insert to be shaped such that it is used in its extension essentially for absorbing compressive/tensile forces, while the plastic structures are subjected predominantly to torsion.

In an advantageous embodiment of the force connection strut according to the present invention, the force connection strut has a T-shaped or L-shaped cross section with two legs in the area of the basic body.

In an especially advantageous embodiment of the force connection strut according to the present invention, the force connection strut has an H-shaped or U-shaped cross section with three legs in the area of the basic body.

This force connection strut may be designed, e.g., such that at least one leg, preferably the centrally located leg, is reinforced by at least one metal insert and is preferably formed by the metal insert. The central leg is defined here as the leg that is arranged between two other—peripheral—legs.

In another embodiment of the force connection strut, at least two legs, preferably the peripherally located legs, are reinforced by at least one metal insert each and are preferably formed by the metal insert. However, it is also possible in this variant to reinforce only one of the peripherally located legs with a metal insert, whereas another leg, lying at right angles thereto, is likewise reinforced, and the second peripherally located leg is made exclusively of plastic.

If an especially high load-bearing capacity and also a high level of residual function after damage are desired, it is possible to reinforce all legs with at least one metal insert each or preferably to form all legs from such a metal insert, but no metallic connection is preferably provided between the individual metal inserts in this case.

If the rigidity, especially the torsional rigidity, is to be improved, it is advantageous to provide cross webs, preferably such made of a plastic, in the area of the basic body. It is also possible due to such a design to make individual legs as perforated legs, so that it is possible to additionally reduce the weight.

Concerning the plastics used, it is also possible to use fiber reinforcements, besides the homogeneous plastic, preferably using glass fibers, carbon fibers or aramide fibers in this case. Such designs with fiber reinforcement in the plastic may be advantageously selected to be such that the percentages of fiber make it possible to extensively adapt the thermal expansion characteristics of the plastic structures to the thermal expansion characteristics of the at least one metal insert at least in the range of the operating temperatures.

Due to this special design, the expansion characteristic of the plastic structures can be adapted to the expansion characteristics of the metal inserts, so that fatigue phenomena, cracking or separation between the metal and the plastic do not develop even in the case of frequent temperature changes.

Since plastics are especially suitable for preparing more complex outer shapes, especially in the case of the use of injection molding methods, the inventors also propose that the outer shape of the force connection strut be defined exclusively by the plastic structure. It is possible as a result, on the other hand, to use simple and easy-to-manufacture structures concerning the metal inserts.

Furthermore, the mount supports arranged at the end can be manufactured from plastic, but mount supports that have a metal insert are possible as well. The metal inserts may be preferably designed such that the mount support including the mount optionally arranged therein pass through this at the end. Since especially strong forces must be absorbed in this end area, and the material is additionally reduced by the mount support, it may be especially advantageous for the metal insert to have a thickening at the end on at least one side, which is prepared, e.g., by means of material layers applied additionally, which are connected to each other as rigidly as possible.

The suitable metal insert is made especially of steel, an alloy based on iron or, if an especially lightweight design is important, also aluminum or aluminum alloys.

If the metal insert is exposed to special environmental conditions, it may be advantageous to apply a corrosion-inhibiting surface protection, and if the outside is unprotected, especially this outside should be coated.

To prevent cracking in the plastic, the metal insert should, in addition, be deburred.

Furthermore, it is proposed that to improve the stability, the metal insert may have beads. As a result, this leads to an improvement in the stability of the metal insert itself, on the one hand, and in the connection between the metal structure and the plastic structure, on the other hand.

In addition, openings may be provided in the metal inserts for reasons of weight reduction and to improve the connection action between the metal and the plastic.

It is also especially favorable for all metal inserts as a whole to be completely surrounded by plastic, because this counteracts the development of corrosion in the area of the metal especially effectively.

In special embodiments of the metal inserts, the end surfaces may form an angle with each other, and they may be preferably arranged at right angles to each other. It is possible to manage the forces acting differently at the respective ends of the force connection strut especially well.

Provisions are made in another special embodiment of the force connection strut according to the present invention for at least one mount support to have a metal sleeve. The elasticity of such a mount support is improved by this metal sleeve. The metal sleeve may, e.g., also have openings, so that an especially rigid connection is obtained between the metal structure and the plastic structure.

The mount support of the force connection strut according to the present invention advantageously has, on the whole, a cylindrical shape, which is preferably provided with a thickening at the end. In addition, the mount support may also have a radial contraction, so that better seating, e.g., of a molecular bearing, is guaranteed.

For example, molecular bearings, ball bearings or even fixed bearings may be used as the bearings, their embodiment depending on the particular intended use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1a is a top view of the axle strut with a metal insert;
FIG. 1b is a cross section through the axle strut from FIG. 1a;
FIG. 1c is a side view of the axle strut from FIG. 1a;
FIG. 2b is a cross section through the axle strut from FIG. 2a;
FIG. 2c is a side view of the axle strut from FIG. 2a;
FIG. 3a is a top view of a straight axle strut with a twisted metal insert;
FIG. 3b.i is a section A—A through the axle strut from FIG. 3a;
FIG. 3b.ii is a section A'—A' from FIG. 3a;
FIG. 3b.iii is a section A"—A" from FIG. 3a;
FIG. 3c is a side view of the axle strut from FIG. 3a;
FIG. 4a is a top view of the axle strut with metal inserts in the peripheral legs;
FIG. 4b is a cross section through the axle strut from FIG. 4a;
FIG. 4c is a side view of the axle strut from FIG. 4a;
FIG. 5 is a top view of the axle strut with metal inserts in the peripheral legs and ribbed and interrupted central leg;
FIG. 6a is a top view of a metal insert with a thickening at the end;
FIG. 6b is a side view of a metal insert with a thickening at the end;
FIG. 7 is a longitudinal section through an axle strut with longitudinal struts arranged in an X-shaped pattern with metal inserts;
FIG. 8a is a top view of a bent axle strut with a metal insert on one side, which wraps around mount supports;
FIG. 8b is a section A—A through the axle strut from FIG. 8a
FIG. 9a is a top view of the axle strut with a metal insert, similar to that of FIG. 1a but with a U-shaped basic body;
FIG. 9b is a cross section through the axle strut of the embodiment of FIG. 9a;
and
FIG. 9c is a side view of the axle strut of FIG. 9a.

DESCRIPTION OF THE PREFERRED EMBODIMENTS

Figure 2A:
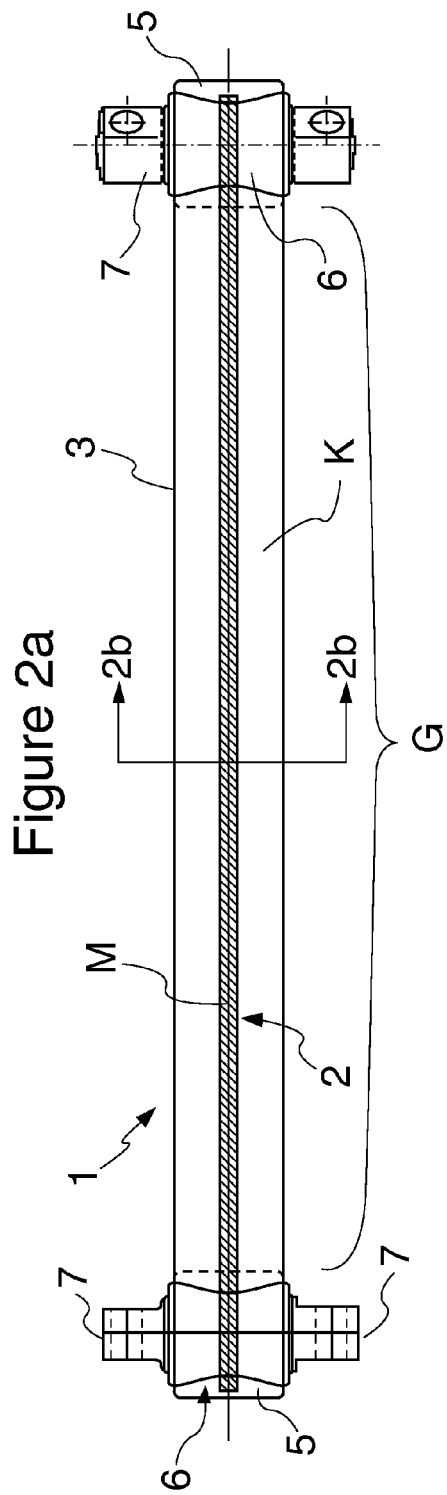
FIG. 2a is a top view of a bent axle strut with a metal insert.

Referring to the drawings in particular, FIGS. 1a through 1c show different views of an axle strut according to the present invention for a truck. The axle strut 1 has a contour with an H-shaped cross section with a central leg 2 and two peripheral legs 3 and 4 connected thereto. A metal insert M, which is completely surrounded by plastic, is located in the central leg 2, and the plastic also defines the overall contour of the axle strut and thus also forms the two peripheral legs 3 and 4 of the basic body G. A mount support 5 each is located at both ends of the basic body G, and the mount support likewise consists of plastic and its outer shape corresponds to a cylinder and has a contraction 6 on the inside. An elastically damping molecular bearing with a journal 7 is inserted into the mount support 5.

The axle strut 1 can be manufactured by punching the metal insert out of a flat sheet metal, but careful deburring of the edges shall be ensured to prevent the edges from damaging the plastic structure during the loads occurring later. This sheet metal is subsequently encased on all sides according to the injection molding process with plastic, preferably with a plastic with fiber insert, and it thus forms the final shape of the axle strut 1.

Figure 2B:
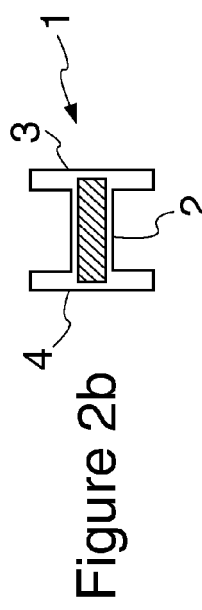
Figure 2C:
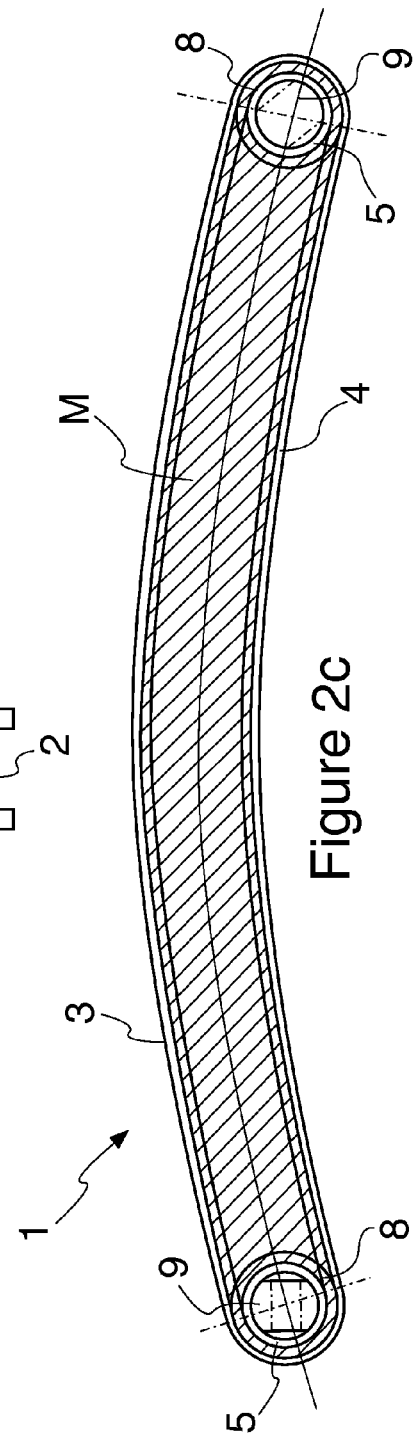

FIGS. 2a through 2c correspond basically to the views in FIGS. 1a through 1c, but the axle strut being shown here has a curvature in the plane of the central leg 2. This axle strut also has an H-shaped cross section and its design corresponds to that of the axle strut in FIGS. 1a through 1c with the exception of the curvature.

Another variant of an axle strut with a single metal insert is shown in FIGS. 3a through 3c. This is an axle strut 1, which has a twisting by 90° in the area designated by "10" in the basic body G. The mount support 5 disposed at the end with the molecular bearing 9 contained therein and with the journals correspond to the designs of the axle struts shown above, but are offset by 90° in relation to one another.

FIGS. 3b.i, 3b.ii and 3b.iii show the sections A—A, A'—A', A"—A" from FIG. 3a. These figures show the continuous transition of the metal insert M with a twist or torsion by 90°, while the profile also changes correspondingly initially from an H-section via a box section to an H-section, but with a 90° rotation in relation to the first H-section.

Another embodiment variant of the axle strut 1 according to the present invention is shown in a top view, as a cross section and as a side view in FIGS. 4a through 4c, respectively. The cross section, which is shown in FIG. 4b, is likewise H-shaped in this embodiment, but the metal insert is inserted this time in the two peripheral legs 3 and 4, so that the mount supports are enclosed in the entire axle strut in a substantially more stable manner due to the legs surrounding the mount support 5 at the end, which makes possible a substantially better force transmission.

FIG. 5 shows a variant of the axle strut from FIG. 4a, wherein the central leg 2, which is made of plastic, is provided with perforations 12 and webs 11 disposed between them here. The weight is thus reduced compared with the embodiment described previously.

For axle struts subject to special loads, it is possible to prepare an additional thickening V in the metal insert. This is shown, e.g., in FIGS. 6a and 6b. FIG. 6a shows a top view of a metal insert M, which is reinforced by metal inserts applied additionally in the end area. FIG. 6b shows a side view of this metal insert M with the thickenings V on both sides.

Instead of the thickening with multiple layers, which is being shown here, it is also possible to manufacture the metal insert from so-called "tailored blanks" or "tailored strips." The areas of the metal insert that are subject to a high load may be made of thicker sheet metal parts and areas subject to lower load may be made from thinner sheet metal parts here, which are welded together to form the entire metal insert.

Another possible embodiment of a force connection strut 1, e.g., of an axle strut of a chassis, is shown as a longitudinal section in FIG. 7. This figure shows an embodiment in which an H-section arranged at the end converges toward the middle with the two peripheral legs 3 and 4, while the central leg 2 tapers toward the middle and disappears in the middle itself. Both peripheral legs 3 and 4 contain a metal insert M each, which extends up to and around the mount support 5.

Finally, FIG. 8a shows a schematic top view of a bent force connection strut, where a metal strip is used as the metal insert M, the metal strip first surrounding the left-hand mount support, beginning at one end, then extends through the first bent peripheral leg 3 and finally surrounds the second mount support on the right-hand side. The outer contour is formed by the plastic encasement around the metal insert in this case as well, and the metal insert ensures that a minimum of functionality is nevertheless preserved even in case of a brittle fracture in the area of the plastic structure. The metal insert consequently forms a tough skeleton within a plastic structure.

This design is shown once again in FIG. 8b in a section A—A from FIG. 8a. It can be clearly recognized here how the first of the two peripheral legs 3 and 4, which surround the central leg 2, is reinforced in the H-shaped cross section with the metal insert (M), which is a flexible strip.

It should also be noted that the openings in the metal inserts—with the exception of the embodiment shown in FIGS. 8a and 8b can be prepared to receive the sleeve and to form the mount support both by simply punching out a hole and by deep drawing and forming an indentation, into which a sleeve can be inserted, or by directly forming a shape that itself corresponds to a sleeve.

On the whole, it is achieved through the design of force connection struts according to the present invention that a substantial weight reduction is achieved, on the one hand, but a 100% loss of the functionality of the force connection strut does not occur immediately at the same time even in case of damage, because the metal insert(s) present offer(s) an additional safety against brittle fracture.

FIGS. 9a through 9c show different views of an axle strut with a general U-shaped cross section with a central leg 2 and two peripheral legs 3 and 4 connected thereto. A metal insert M is surrounded by plastic and is located in the central leg 2. The plastic also defines the overall contour of the axle strut and forms two peripheral legs 3 and 4 of the basic body G. A mount support 5 is located at each of the two ends of the basic body G. The mount support consists essentially of plastic (although the metal element reinforces this as shown). The outer shape of the plastic supports correspond to a cylinder and there is a contraction 6 on an inside.

While specific embodiments of the invention have been shown and described in detail to illustrate the application of the principles of the invention, it will be understood that the invention may be embodied otherwise without departing from such principles.

The invention claimed is:

1. force connection strut of a chassis of a passenger car or utility vehicle, the strut comprising:
    an elongated basic body; and
    at least two mount supports, each of said mount supports being arranged at a respective end of the strut, for introducing and leading out forces, said basic body having a composite of at least one flat metal insert and a plastic structure forming the rest of a contour, said plastic structure being formed by the at least partial encasement of said metal insert, wherein said basic body comprises at least a first leg and another leg extending substantially normal to said first leg and with one of said first leg and said another leg reinforced by said at least one metal insert.

2. A force connection strut in accordance with patent claim 1 above, wherein said metal insert is shaped and disposed relative to said plastic structure over its extension essentially to absorb compressive/tensile forces and said plastic structure is shaped and disposed relative to said metal insert to absorb torsion.

3. A force connection strut in accordance with claim 1, wherein the strut has an H-shaped or U-shaped cross section with said basic body having still another leg extending substantially normal to said first leg.

4. A force connection strut in accordance with patent claim 3 above, wherein, said first leg is a centrally located leg reinforced by said at least one metal insert.

5. A force connection strut in accordance with patent claim 3 above, wherein said another leg and said still another leg are peripherally located legs each reinforced by one of said at least one metal insert such that said another leg is formed by one of said at least one metal insert and such that said still another leg is formed by one of said at least one metal insert.

6. A force connection strut in accordance with patent claim 3 above, wherein said another leg and said still another leg are each reinforced by one of said at least one metal insert such that said another leg is formed by one of said at least one metal insert and such that said still another leg is formed by one of said at least one metal insert, but have no metallic connection among each other.

7. A force connection strut in accordance with claim 1, wherein said another leg and still another leg form cross webs made of plastic provided in the area of said basic body.

8. A force connection strut in accordance with claim 1, wherein the plastic used has at least some fiber reinforcements consisting essentially of one or more of glass fibers, carbon fibers or aramide fibers.

9. A force connection strut in accordance with patent claim 8 above, wherein the percentages of fiber are selected to be such that the thermal expansion characteristics of said plastic structure correspond at least extensively to the thermal expansion characteristics of said at least one metal insert in the range of the operating temperatures.

10. A force connection strut in accordance with claim 1, wherein an outer shape is determined exclusively by said plastic structure.

11. A force connection strut in accordance with claim 1, wherein both said two mount supports consist essentially of plastic.

12. A force connection strut in accordance with patent claim 11 above, wherein at least one said mount support including a mount that may be arranged therein, passes through said at least one metal insert.

13. A force connection strut in accordance with claim 1, wherein said at least one metal insert has, at least on one side, a thickening arranged at an end formed by additional material layers.

14. A force connection strut in accordance with claim 1, wherein at least one said metal insert consists of steel or an iron-based alloy.

15. A force connection strut in accordance with claim 1, wherein said at least one metal insert consists essentially of aluminum or an aluminum alloy.

16. A force connection strut in accordance with claim 1, wherein said at least one metal insert has a corrosion-inhibiting surface protection, at least on an unprotected outer side.

17. A force connection strut in accordance with claim 1, wherein said at least one metal insert is deburred.

18. A force connection strut in accordance with claim 1, wherein said at least one metal insert has openings.

19. A force connection strut in accordance with claim 1, wherein said at least one metal insert is completely surrounded by plastic.

20. A force connection strut in accordance with claim 1, wherein surfaces of said at least one metal insert are arranged at an end to form an angle with one another.

21. A force connection strut in accordance with claim 1, wherein said at least one mount support has a metal sleeve.

22. A force connection strut in accordance with patent claim 21 above, wherein said metal sleeve has openings.

23. A force connection strut in accordance with claim 1, wherein at least one said mount support has a cylindrical shape, preferably with at least one thickening arranged at an end.

24. A force connection strut in accordance with claim 1, wherein at least one mount support has an inner radial contraction.

25. A force connection strut in accordance with claim 1, wherein a molecular bearing or a ball bearing or a fixed bearing is provided in at least one said mount support.

26. A force connection strut in accordance with claim 1, wherein said metal insert consists of tailored blanks or tailored strips, made from sheet metals of different thicknesses.

27. A force connection strut in accordance with claim 1, further comprising metal inserts applied one on each side of said at least one metal insert at an area of one end of the force connection strut and metal inserts applied on each side of said at least one metal insert at another end of the force connection strut.

28. A force connection strut in accordance with claim 1, wherein said at least one metal insert is completely flat with even surfaces.

29. A force connection strut of a chassis of a passenger car or utility vehicle, the strut comprising:
    an elongated basic body; and
    at least two mount supports, each of said mount supports being arranged at a respective end of the strut for introducing and leading out forces, said basic body having a composite of at least one flat metal insert and a plastic structure forming the rest of a contour, said plastic structure being formed by the at least partial encasement of said metal insert, said strut having two peripheral legs and a central leg arranged between said peripheral legs, said central leg comprising webs defining openings between adjacent said webs.

30. A force connection strut of a chassis of a passenger car or utility vehicle, the strut comprising:
    an elongated basic body; and
    at least two mount supports, each of said mount supports being arranged at a respective end of the strut for introducing and leading out forces, said basic body having a composite of at least one flat metal insert and a plastic structure forming the rest of a contour, said plastic structure being formed by the at least partial encasement of said metal insert, said basic body twisting by 90° from a location adjacent to one of said two mount supports to a location adjacent to another of said two mount supports.

* * * * *